United States Patent
Ghaemi et al.

(10) Patent No.: US 10,461,540 B2
(45) Date of Patent: Oct. 29, 2019

(54) SCALABLE FLEXIBILITY CONTROL OF DISTRIBUTED LOADS IN A POWER GRID

(71) Applicant: General Electric Technology GmbH, Baden (CH)

(72) Inventors: Reza Ghaemi, Watervliet, NY (US); Masoud Abbaszadeh, Clifton Park, NY (US); Chaitanya Ashok Baone, Glenville, NY (US); Naresh Acharya, Niskayuna, NY (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 420 days.

(21) Appl. No.: 15/462,136

(22) Filed: Mar. 17, 2017

(65) Prior Publication Data
US 2018/0269687 A1    Sep. 20, 2018

(51) Int. Cl.
*H02J 3/38* (2006.01)
*H02J 3/00* (2006.01)
(Continued)

(52) U.S. Cl.
CPC ............... *H02J 3/383* (2013.01); *H02J 3/00* (2013.01); *H02J 3/386* (2013.01);
(Continued)

(58) Field of Classification Search
CPC .......... H02J 3/14; H02J 3/381; H02J 13/0006; H02J 3/383
See application file for complete search history.

(56) References Cited

U.S. PATENT DOCUMENTS

| 4,216,384 A * | 8/1980 | Hurley | H02J 3/14 307/35 |
|---|---|---|---|
| 8,260,468 B2 | 9/2012 | Ippolito et al. | |

(Continued)

FOREIGN PATENT DOCUMENTS

| CN | 102437653 B | 3/2015 |
|---|---|---|
| WO | 2016172348 A1 | 10/2016 |

OTHER PUBLICATIONS

Ferrarini, et al., "A Distributed Model Predictive Control approach for the integration of flexible loads, storage and renewables," 2014 IEEE 23rd International Symposium on Industrial Electronics (ISIE), 6 pages.

(Continued)

*Primary Examiner* — Alfonso Perez Borroto
(74) *Attorney, Agent, or Firm* — Buckley, Maschoff & Talwalkar, LLC

(57) ABSTRACT

The technology described herein is generally directed towards a distributed optimization technology for the control of aggregation of distributed flexibility resource nodes that operates iteratively until a commanded power profile is produced by aggregated loads. The technology uses a distributed iterative solution in which each node solves a local optimization problem with local constraints and states, while using a global Lagrange multiplier that is based upon information from each other node. The global Lagrange multiplier is determined at an aggregation level using load-specific information that is obtained in a condensed form (e.g., a scalar) from each node at each iteration. The global Lagrange multiplier is broadcasted to the nodes for each new iteration. The technology provides an iterative, distributed solution to the network optimization problem of power tracking of aggregated loads.

20 Claims, 10 Drawing Sheets

(51) Int. Cl.
*H02J 13/00* (2006.01)
*H02J 3/14* (2006.01)

(52) U.S. Cl.
CPC ..... *H02J 13/0006* (2013.01); *H02J 2003/003* (2013.01); *H02J 2003/007* (2013.01); *H02J 2003/146* (2013.01); *Y02E 10/563* (2013.01); *Y02E 10/763* (2013.01); *Y02E 40/72* (2013.01); *Y04S 10/123* (2013.01)

(56) References Cited

U.S. PATENT DOCUMENTS

| | | | |
|---|---|---|---|
| 8,818,889 B2 | 8/2014 | Papavasiliou et al. | |
| 9,411,329 B2 | 8/2016 | Greene et al. | |
| 9,819,194 B2* | 11/2017 | Joko | H02J 3/14 |
| 2008/0122518 A1* | 5/2008 | Besser | H02J 3/382 |
| | | | 327/518 |
| 2011/0231320 A1 | 9/2011 | Irving | |
| 2014/0306533 A1* | 10/2014 | Paquin | H02J 3/383 |
| | | | 307/52 |
| 2015/0295405 A1 | 10/2015 | Black et al. | |
| 2016/0094034 A1* | 3/2016 | Divan | H02J 3/18 |
| | | | 307/11 |
| 2017/0102726 A1* | 4/2017 | Goldsmith | G06Q 50/06 |

OTHER PUBLICATIONS

Xu, et al., "Operation Strategies of the Load Aggregator with Electric Energy Storage," 2012 IEEE International Conference on Power System Technology (POWERCON), 6 pages.

Babar, et al., "The conception of the aggregator in demand side management for domestic consumers," International Journal of Smart Grid and Clean Energy, vol. 2, No. 3, Oct. 2013, 5 pages.

Halvgaard, et al., "Thermal Storage Power Balancing with Model Predictive Control," 2013 European Control Conference (ECC) Jul. 17-19, 2013, Zurich, Switzerland, 6 pages.

Ghaemi, et al., "Scalable Optimal Flexibility Control of Distributed Loads in Power Grid," Last Accessed: May 2, 2017, 7 pages.

Loukarakis, et al., "Investigation of Maximum Possible OPF Problem Decomposition Degree for Decentralized Energy Markets," IEEE Transactions on Power Systems, © 2014 IEEE, DOI: 10.1109/TPWRS.2014.2365959, 13 pages.

Motto, et al., "On Walrasian Equilibrium for Pool-Based Electricity Markets," IEEE Power Engineering Review, Jun. 2002, 1 page.

* cited by examiner

US 10,461,540 B2

SCALABLE FLEXIBILITY CONTROL OF DISTRIBUTED LOADS IN A POWER GRID

STATEMENT REGARDING GOVERNMENT RIGHTS

The present invention was made with Government support under contract number DE-AR0000698 awarded by the United States Department of Energy. The Government has certain rights in this invention.

TECHNICAL FIELD

This disclosure generally relates to load (demand) side power grid control.

BACKGROUND

The power generation industry is transitioning from being mostly based on a small number of large centralized power plants to a diversified network that combines conventional power plants, renewable power generation (e.g., solar, wind and the like), energy storage and microgrids. Traditionally, power grids have been designed to accommodate variable load demand, in which central-station power plants at a transmission level provide services down to the industrial, commercial and residential end users at a distribution level.

As renewable energy is becoming a major contributor in meeting demand, the grid control system needs to provide more flexibility for power systems to compensate for the volatility of renewable energy. More particularly, due to uncertainties in renewable energy resource availability, renewable power generation cannot be accurately forecast.

To facilitate the penetration of renewable power generation (such as wind turbines and solar panels) into the power grid, load-side control is used. In general, the purpose of load-side control is to attempt to optimize the collective power consumption of the loads (such as buildings), including to accommodate uncertainties in the renewable power generation

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards receiving respective condensed datasets representative of respective load-specific information received from respective load controllers, wherein the respective load controllers are coupled to control a power-consuming load that obtains power from a power grid, and wherein the respective condensed datasets are smaller in size than respective full datasets associated with the respective load controllers. Described herein is determining a global value and a step size based on the respective condensed datasets and a specified aggregated power level. Aspects comprise sending the global value and the step size to the respective load controllers for use in adjusting respective local power consumptions of the respective load controllers and adjusting local control variables to satisfy the specified aggregated power level, receiving respective updated condensed datasets from the respective load controllers that update the respective condensed datasets, wherein the respective updated condensed datasets are based on the respective load-specific information associated with the power-consuming load of the respective load controllers after the adjusting of the respective local power consumptions and local control variables in respective step directions determined by the respective load controllers, and determining, from the respective updated condensed datasets, whether the respective load controllers have satisfied the specified aggregated power level to a defined extent, and in response to determining that the specified aggregated power level has not been satisfied to the defined extent. Other aspects comprise determining an updated global value and an updated step size based on the respective updated condensed datasets and the specified aggregated power level, and sending the updated global value and the updated step size to the respective load controllers for use in further adjusting the respective local power consumptions to satisfy the specified aggregated power level.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
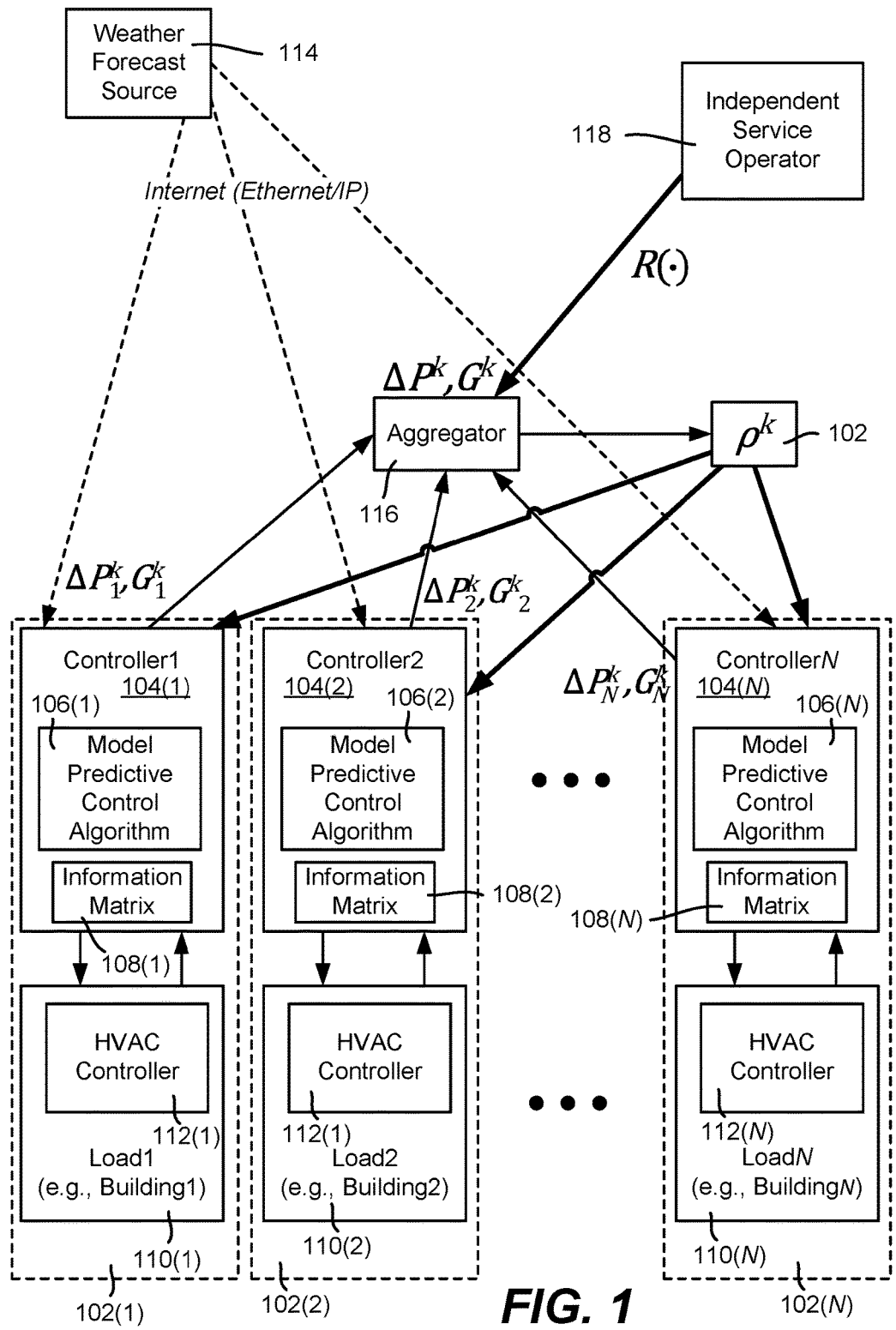
FIG. 1 is an example block diagram representation of an environment in which an aggregator load structure communicates with nodes corresponding to controlled loads, according to one or more example implementations.

Various aspects of the technology described herein are generally directed towards distributed load-side power control. In one or more aspects, the technology comprises a distributed optimization approach for control of an aggregation of distributed flexibility resources (DFRs, which may be referred to as nodes), such that a commanded power profile (e.g., specified by an independent service operator) is produced by aggregated loads. In general, and as will be understood, the technology is based on a distributed iterative solution to solve a network utility maximization problem.

In general, each distributed flexibility resource node solves a local optimization problem with its own local constraints (e.g., limits on temperature of a building) and states. However, the cost function incorporates a global (that is, shared by all nodes) Lagrange multiplier to augment information from the full set of distributed nodes, to track the need for additional power (via a reserve request signal) as an aggregate entity. To this end, the global Lagrange multiplier is calculated at an aggregation level using information that is gathered from each node, with the newly calculated global Lagrange multiplier, associated with the constraint that requests that aggregated power needs to equal the command power generated by an independent service operator, broadcast to each node. The operations are iterative; each node uses the received Lagrange multiplier to perform one iteration of an optimization algorithm that calculates the search direction using the given Lagrange multiplier and sends updated information to an aggregator, which then recalculates a new Lagrange multiplier from the updated information, broadcasts the new Lagrange multiplier to the nodes for a next optimization iteration, and so on, until the aggregator determines that a sufficient level (some defined level) of convergence is reached. This procedure is performed at each sample time and once convergence occurs, loads apply the computed optimal control.

The technology described herein solves the network optimization problem of power tracking of aggregated loads in a distributed fashion. More particularly, solving a large scale optimization problem arising from the optimization of (on the order of) hundreds of thousands or even millions of loads in a centralized way is computationally infeasible, whereby traditional approaches are not able to handle local constraints of the loads and achieve aggregated power tracking performance. The technology described herein provides an iterative, distributed way of computing optimization that makes solving such a large scale optimization problem tractable.

It should be understood that any of the examples herein are non-limiting. As such, the technology described herein is not limited to any particular implementations, embodiments, aspects, concepts, structures, functionalities or examples described herein. Rather, any of the implementations, embodiments, aspects, concepts, structures, functionalities or examples described herein are non-limiting, and the technology may be used in various ways that provide benefits and advantages in power control concepts in general.

In general and as represented in FIG. 1, a number of (distributed flexibility resource) nodes 102(1)-102(N) are managed as described herein with respect to power control. There may be any practical number of nodes, possibly on the order of millions.

The represented nodes 102(1)-102(N), comprise controllers 104(1)-104(N) having model predictive control algorithms 106(1)-106(N) and information matrixes 108(1)-108(N) that describe the local states and constraints of the node. One example state is the local weather forecast obtained from a source 114 such as the National Oceanic and Atmospheric Administration (NOAA), as the weather influences renewable power source output as well as corresponds to how much power a node is likely to need for heating or cooling, for example. Other state that may be maintained may be room temperatures, zone temperatures, heating and cooling characteristics, time of day, day of week and so on.

The exemplified nodes 102(1)-102(N) are also represented in FIG. 1 as comprising loads 110(1)-110(N), which are further exemplified as being controllable by heating, ventilation and air conditioning (HVAC) controllers 112(1)-112(N), respectively. A typical example of a load is a building, however it is understood that a building or the like may correspond to multiple, separate loads (e.g., separate nodes), and/or multiple buildings or the like may correspond to a single load (node).

The nodes 102(1)-102(N) are coupled via their respective controllers 104(1)-104(N) to an aggregator 116. In general and as described herein, the aggregator 116 receives a commanded power profile from an independent service operator (ISO) 118, and uses that information along with local load-specific information received from each controller 104(1)-104(N) to compute a global Lagrange multiplier 120 mathematically represented by $\rho^k$ (at iteration k). The global Lagrange multiplier 120 computed by the aggregator 116 is sent to the controllers 104(1)-104(N), for use by each controller in solving its local optimization problem.

To summarize thus far, the technology is directed towards attempting to more optimally control distributed flexibility resource nodes, such that the aggregated power tracks a commanded power profile that comes from the independent service operator 118. The optimization problem is solved in a distributed way, where each distributed flexibility resource node exchanges data with the aggregator and performs one optimization iteration according to the distributed optimization scheme described herein to solve the global model predictive control optimization problem in a tractable fashion.

In one or more implementations, the modified local cost function is the sum of a local cost (local utility function) and a Lagrange multiplier times the power consumed (supplied) by the distributed flexibility resource. The value of the Lagrange multiplier 120 that is shared among the nodes 102(1)-102(N) is calculated at the aggregator level. At the aggregator 116, the Lagrange multiplier is a function of the commanded power profile and the local data that are sent to the aggregator 116 at each iteration of optimization. The recalculated Lagrange multiplier is send back to the nodes to be used in the cost for next iteration, and so on. As the nodes iterate synchronously, they converge towards an acceptable solution (that is, to a defined/predetermined convergence threshold) to the network/global Model Predictive Control optimization problem through the aforementioned iterative distributed computation scheme.

Figure 2:
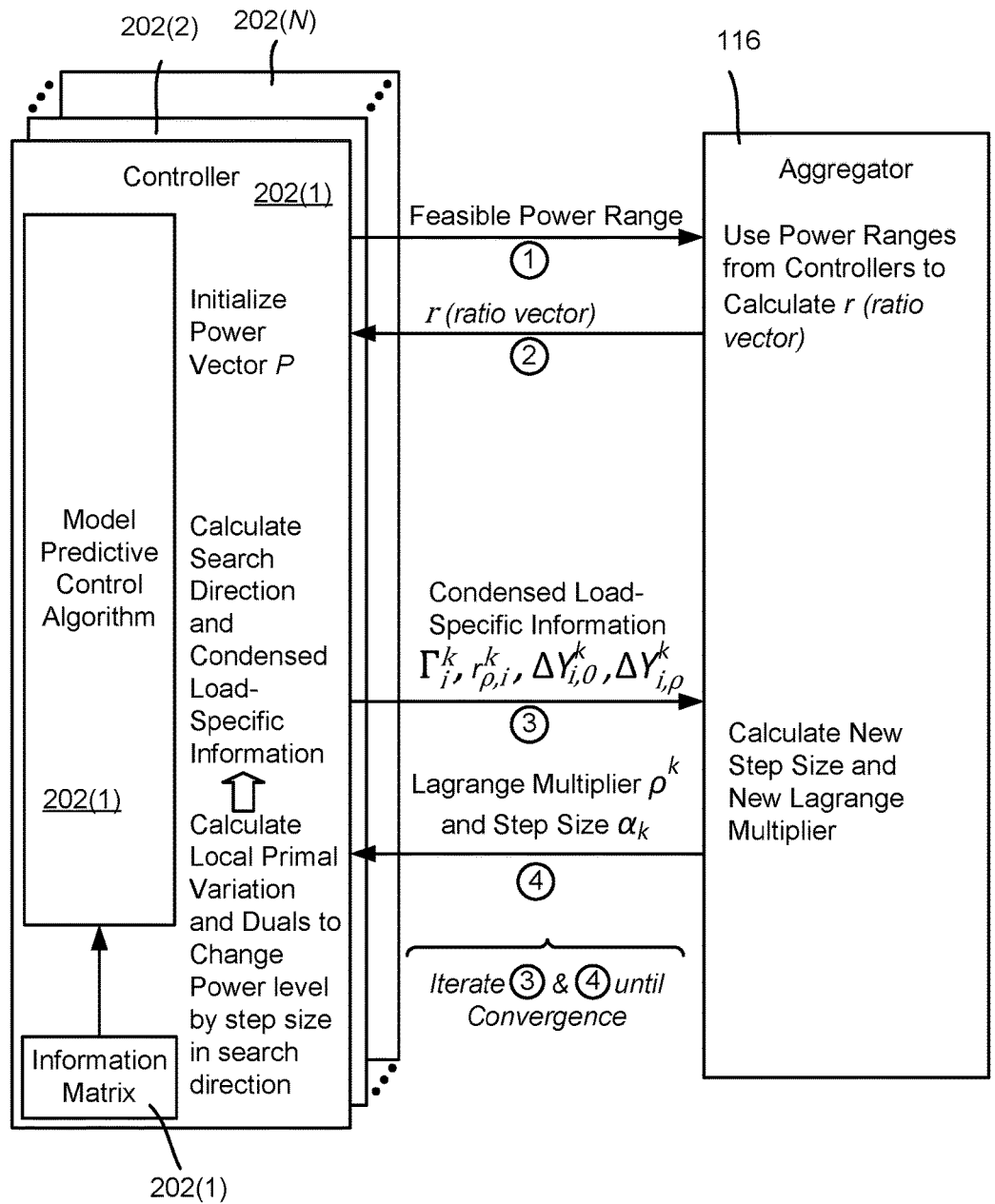
FIG. 2 is an example block/data flow diagram representing a controller communicating information with an aggregator to iteratively converge towards an optimal solution, according to one or more example implementations.

As represented in FIG. 2 for an example controller instance 204(1) (of a set of controller instances 204(1)-204(N)), the iterative distributed scheme can be described in the following operations, also exemplified in the flow diagram of FIG. 3. At a time to adjust, such as once per minute (operation 302 of FIG. 3), each of the controllers are initialized (represented by labeled arrows one (1) and two (2) in FIG. 2, and also by operation 304 of FIG. 3). In general, and as further described herein, the controller 204(1) sends its feasible power range to the aggregator 116, which then uses the feasible power ranges of the various controller instances 204(1)-204(N) to compute a ratio (e.g., a vector r) for each controller. This ratio is used to compute an initial power vector at each load (operation 304 of FIG. 3).

Figure 3:
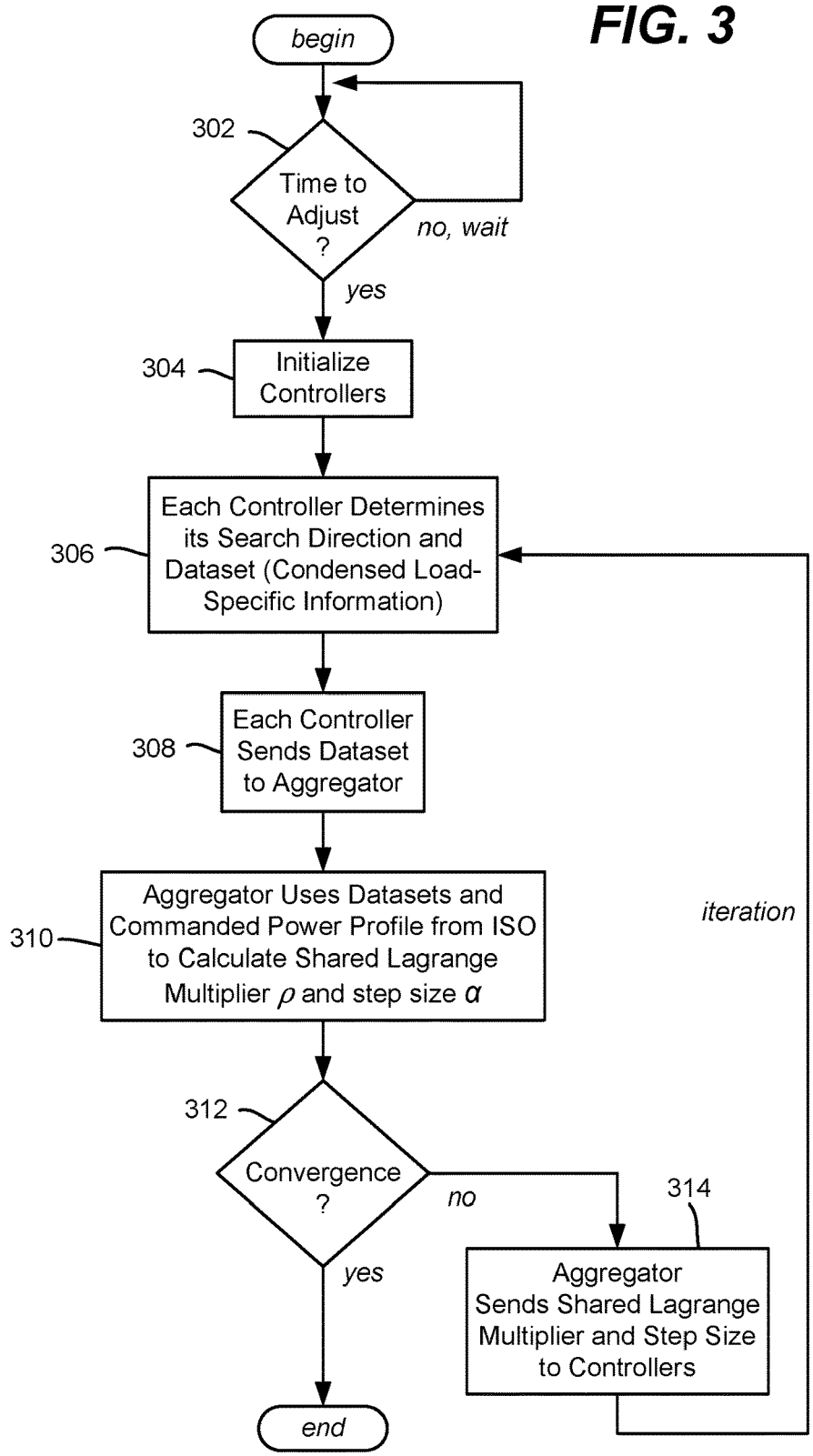
FIG. 3 is a flow diagram showing example operations of an iterative, distributed power control technology, according to one or more example implementations.

Once initialized, the communications represented by labeled arrows three (3) and four (4) in FIG. 2, and the operations 306, 308, 310, 312 and 314 of FIG. 3 are performed iteratively. At step 306, each controller solves the search direction for the local nonlinear programming problem as described below. As a side product, a set of data comprising load-specific information (a dataset in condensed form, e.g., as scalars) is also generated and sent to the aggregator 116 (arrow three (3) in FIG. 2, operation 308 in FIG. 3).

At the aggregator, at operation 310, using the data collected from the nodes and the commanded power profile from the independent service operator, the shared Lagrange multiplier is calculated, along with a step size. If convergence to the desired, defined level is not yet achieved (operation 312), the Lagrange multiplier and step size is sent to the nodes (arrow four (3) in FIG. 2 and operation 314 in FIG. 3).

Using the new value of the Lagrange multiplier, a new search direction and an updated dataset is calculated by iteratively returning to step 306. The updated dataset is sent from the controller to the aggregator (arrow three (3) in FIG. 2 and operation 308 in FIG. 3. The aggregator computation at operation 310 and the broadcast to the nodes at operation 314 is repeated and so on, until the convergence is detected at operation 312.

Turning to additional details, in one or more implementations, the distributed optimal control technology uses an algorithm based on a distributed computation of the Newton iteration, which provides faster convergence relative to other methods (such as alternating direction method of multipliers or sub-gradient methods). As will be understood, the distributed optimal control technology exploits a structure of the problem to calculate an exact Newton step as opposed to inexact versions that require iterations to calculate the Newton direction. The technology described herein coordinates loads and distributed energy resources, and exploits their flexibilities such that the aggregated energy follows the profile commanded by the ancillary services, where ancillary services are basically those functionalities provided by the power grid that support a continuous flow of power and work to guarantee that supply will meet demand.

For each load, an optimization problem is defined essentially as a local model predictive control formulation. The cost represents local objectives, and constraints are determined by dynamics and other operational and quality of service (QoS) constraint or constraints on states and inputs of the systems; e.g., temperate comfort interval may be a QoS constraint. The power tracking constraint is generally the only system-level constraint that couples the local sub-system-level optimization problems. Hence, it leads to a global optimization problem whose solution meets local objectives and constraints, and at the same time provides total power that follows the power profile demanded by the ancillary services.

Defined herein is a global optimization problem, along with an algorithm that is scalable and can efficiently solve the problem in a distributed manner. The solution calculates Newton steps (e.g., exact Newton steps) and step size in a distributed fashion in the sense that at the load, load-level information related to the step size is calculated and sent to the aggregator, and at the aggregator level, the step size is calculated using that information, so that while the solution enjoys fast convergence of Newton primal iterations, it is also scalable to a large number of loads Consider a network of loads and differential algebraic equations as represented by a set $\mathcal{L} = \{L_1, \ldots, L_N\}$. For each load there are states and inputs that define the dynamic of the load that are usually defined by a set of differential algebraic equations. Differential algebraic equations are converted to discrete time equations to construct equality constraints for numerical optimization. Constraints on inputs or state form another set of equality and inequality constraints. The local optimization problem that formulates model predictive control for the load $L_i \in \mathcal{L}$ is characterized as $$\min_{X_i} f_i(X_i) \tag{1}$$
$$\text{s.t.} \quad g_i(x_i) \leq 0$$
$$h_i(X_i) = 0$$
$$P_i = m_i(X_i)$$

where $X_i$ is the vector containing states, inputs and algebraic variables over the prediction horizon, $f_i$ is the local cost function of the optimization problem, $h_i$ and $g_i$ are the functions characterizing equality constraint containing discrete-time dynamics and other constraints imposed due to physics or stability of the load. $P_i$ is the vector representing the power dispatched over the prediction horizon and $m_i$ is the map from $X_i$ to $P_i$. The power tracking constraint $$P_d = \sum_{i=1}^{N} P_i \tag{2}$$

is imposed to make the aggregated power follow the target power $P_d$, where $P_d$ is the vector containing the desired power profile over the prediction horizon. Local optimization problems subject to the global constraint construct the following optimization problem:

$$\min_{\{X_i, i=1,\ldots,N\}} \sum_i f_i(X_i) \tag{3a}$$
$$\text{such that } g_i(x_i) \leq 0 \tag{3b}$$
$$h_i(X_i) = 0 \tag{3c}$$
$$P_i = m_i(X_i) \tag{3d}$$
$$P_d = \sum_{i=1}^{N} P_i \tag{3e}$$

The optimization problem defines a global model predictive control framework where the problem is solved iteratively to determine an optimal control sequence for each load such that the control sequence optimizes the local objective subject to local dynamics and constraints, while the aggregated dispatched power by the loads track the desired power profile determined by any ancillary services. The first element of the optimal control sequence for each load is implemented at each sample time.

As described herein, an assumption is that the functions $g_i$, $h_i$ and $m_i$ are linear and the functions $f_i$ are self-concordant. The problem may be reformulated to one with only an equality constraint by introducing a non-negative slack vector $S_i \geq 0$ such that $g_i(X_i) + S_i = 0$, and logarithmic barrier functions of slack variables. Then define $Y_i := [X_i^T, S_i^T]^T$, $E(Y_i) := [(g_i(X_i) + S_i)^T, \ (h_i(X_i))']$, $M_i(Y_i) := m_i(X_i)$ and $F_i(Y_i,\mu):=f_i(X_i)+\mu(br(S_i))$ where the barrier function of the vector $S_i$, $br(S_i)$, is defined as $br(S_i)=\Sigma_{j=1}^{|S_i|}-\log S_j^i$, wherein $S_i=S_i^1,\ldots,S_i^{|S_i|}$, $|S_i|$ is the dimension of the vector $S_i$, and $\mu \le 1$ is the positive coefficient of the barrier functions. Because $E_i$ and $M_i$ are affine functions they can be written as $E_i(Y_i)=A_iY_i-b_i$ and $M_i(Y_i)=C_iY_i-d_i$. Hence, the problem is in the following form:

$$\min_{\{Y_i, i=1,\ldots,N\}} \sum_i f_i(Y_i) \tag{4a}$$

$$\text{s.t. } A_i(Y_i) = b_i \tag{4b}$$

$$P_i = C_iY_i - d_i \tag{4c}$$

$$P_d = \sum_{i=1}^N P_i \tag{4d}$$

An assumption is that the matrix $[A_i^T, C_i^T]^T$ is full row rank; it is straightforward to prove that this holds for large class of systems, if in the subsystem $L_i$, the power is an input of the system and (eq. 3c) represents the linear dynamic of the system.

Moreover, let $J(Y):=\Sigma_i F_i(Y_i)$ where J denotes the objective function and Y is the concatenation of $Y_i$, $i=1,\ldots,N$. The matrices and vectors A, b, C and d are defined with appropriate dimensions such that AY–b and $P_d$=CY+d represent the equality constraints.

Therefore, the optimization problem may be written as $$\min_Y J(Y) \tag{5a}$$

$$\text{such that } AY = b \tag{5b}$$

$$P_d = CY + d \tag{5c}$$

Described herein is a distributed optimization scheme to solve the above optimization problem. The scheme is based on the equality constrained Newton method, where the Newton direction and step size are calculated in a distributed fashion using data communication between an aggregator and the loads.

Define $\{Y^k\}$ as the sequence of primal vectors and $\{\lambda^k\}$ the sequence of dual variables associated with constraints (eq. 5b), and $\{\rho^k\}$ the sequence of dual variables associated with the power balance constraint (eq. 5c), generated by Newton iterations. The algorithm updates the sequence of primal vectors by $$Y^{k+1}=Y^k+\alpha_k \Delta Y^k \tag{6}$$

where $0 \le \alpha_k \le 1$ and $\Delta Y^k$ is the Newton search direction given by $$H^k \Delta Y^k + A^T \lambda + C^T \rho = -\nabla_Y J(Y^k)$$

$$A\Delta Y = 0$$

$$C\Delta Y = 0 \tag{7}$$

where $H^k:=\nabla^2 J(Y^k)$. It is desired to solve (eq. 7) in a distributed fashion that is scalable such that it can be deployed for very large number of loads. To this end, described herein is exploiting the special sparsity of the problem to explicitly calculate the search direction. The following theorem enables the development of a distributed iterative algorithm to the calculate Newton search direction.

Assume the optimization problem set forth above is strictly feasible. Given primal vectors $Y_i$, $i=1,\ldots,N$, the Lagrange multiplier associated with the power tracking constraint (5c) is set forth in (7) is given by $$\rho^k = \Gamma^{k-1} r_\rho^k \tag{8}$$

where $$\Gamma^k := \sum_{i=1}^N [C_i \ 0](K_i^k)^{-1}\begin{bmatrix} C_i^T \\ 0 \end{bmatrix}, \tag{9}$$

$$r_\rho^k := \sum_{i=1}^N [C_i \ 0](K_i^k)^{-1}\begin{bmatrix} \nabla_{Y_i} F_i(Y_i) \\ 0 \end{bmatrix}, \tag{10}$$

$$\text{and } K_i^k := \begin{bmatrix} H_i^k & A_i^T \\ A_i & 0 \end{bmatrix}$$

is the local KKT (Karush-Kuhn-Tucker) matrix. Moreover, $\Delta Y_i^k$ and $\lambda_i^k$ are calculated as $$\begin{bmatrix} \Delta Y_i^k \\ \lambda_i^k \end{bmatrix} = -(K_i^k)^{-1}\begin{bmatrix} C_i^T \\ 0 \end{bmatrix}\rho^k - (K_i^k)^{-1}\begin{bmatrix} \nabla_{Y_i} F_i(Y_i) \\ 0 \end{bmatrix}, \tag{11}$$

where the matrix and vector 0 are with appropriate dimensions.

As proof, (7) may be written in the following form:

$$H_i^k \Delta Y_i^k + A_i^T \lambda_i^k + C_i^T \rho_i^k = -\nabla_{Y_i} F_i(Y_i) \tag{12a}$$

$$A_i \Delta Y_i = 0 \tag{12b}$$

$$\sum_{i=1}^n C_i \Delta Y_i = 0, i = 1, \ldots, N. \tag{12c}$$

From (eq. 12a), (eq. 12b), and the definition of the local KKT matrix $K_i^k$, (eq. 11) results.

From (eq. 12c) and (eq. 11), $\Gamma^k \rho^k + r_\rho^k = 0$. According to the above assumption that the matrix $[A_i^T, C_i^T]^T$ is full row rank, the matrix $[A^T, C^T]^T$ is full row rank. Moreover, since $H^k$ is strictly positive definite, and the functions $g_i$, $h_i$ and $m_i$ are linear and the functions $f_i$ are self-concordant, (eq. 7) has a unique solution. Hence, $\Gamma^k$ has to be invertible, otherwise no or infinite values for $\rho^k$ exist that satisfy (eq. 7) along with their corresponding vectors $\Delta Y^k$ and $\lambda^k$. Therefore (eq. 8) holds.

To be able to implement primal vector update (eq. 6), the value of $\alpha_k$ needs to be calculated. The step size is determined by the Newton decrement (ND), defined as $$ND(Y^k):=\sqrt{\Delta Y_k^T H_k \Delta Y_k}. \tag{13}$$

ND can be written in terms of local information $Y_i^k$ as $$ND(Y_k) = \sqrt{\sum_i \Delta Y_i^{k^T} H_i^k \Delta Y_i^k} \tag{14}$$

The step size $\alpha_k$ then is calculated as a function of ND as follows:

$$\alpha_k = \begin{cases} \frac{1}{ND(Y^k)+1} & \text{if } ND(Y^k) \geq 1 \\ 1 & \text{otherwise} \end{cases} \quad (15)$$

Because the cost function J(Y) is self-concordant and the constraints are linear, the step size calculated according to (eq. 15) provides linear and then quadratic convergence to the optimal solution in two stages. Described herein is having the Newton direction $Y^k$ and step size $\alpha_k$ calculated in a distributed fashion at the aggregator using the data gathered by communication between the aggregator and loads.

FIGS. 1 and 2 describe the communication structure of the aggregator and nodes through which the Newton direction and step size are calculated. In one or more implementations, as described in FIG. 3, the operations occur in two general stages. A first stage is feasible initialization, described herein with reference to the example flow diagrams of FIG. 4 (the aggregator initialization-related operations) and FIG. 6 (the controller initialization-related operations), where each load is initialized by the power that is locally feasible and satisfies the power balance constraint (eq. 5c). A second stage is optimization iterations, described herein with reference to the example flow diagrams of FIG. 5 (the aggregator optimization-related operations) and FIG. 7 (the controller optimization-related operations).

Figure 4:
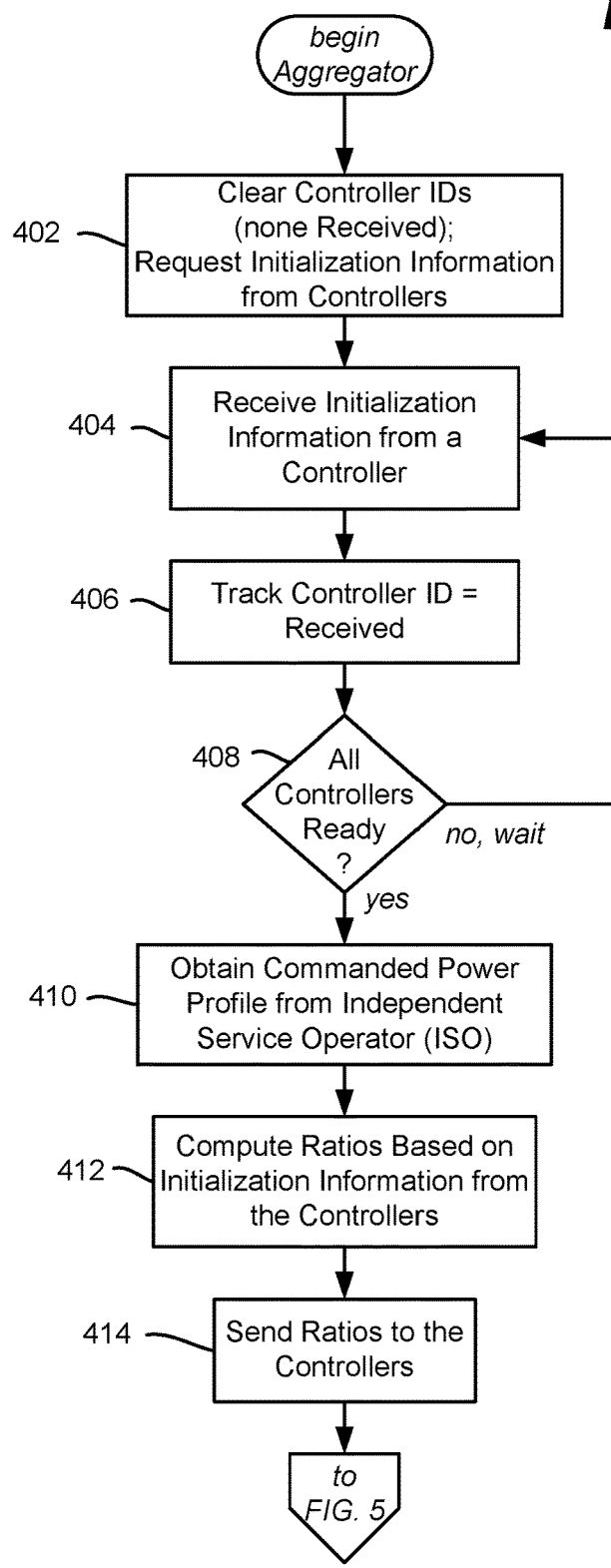
FIGS. 4 and 5 comprise a flow diagram showing example operations of an aggregator, according to one or more example implementations.
Figure 6:
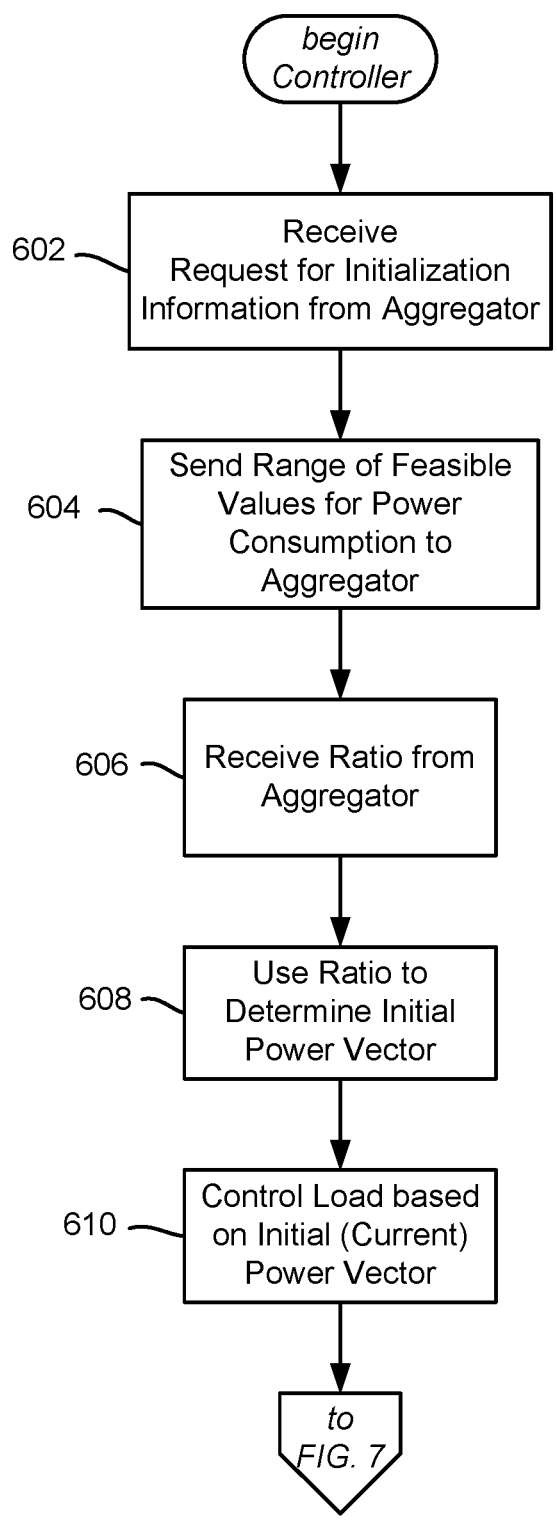
FIGS. 6 and 7 comprise a flow diagram showing example operations of a per-load distributed controller, according to one or more example implementations.

The initialization phase may, in one or more implementations, be started by the aggregator initializing itself and requesting that each controller provide power feasible information (operation 402 of FIG. 4 and operation 602 of FIG. 6).

For each load $L_i \in \mathcal{L}$, a range (interval) $[P_{min}^i, p_{max}^i]$ is assumed which defines the feasible values for power consumption. Hence, each of the loads sends its respective upper and lower limit of the power feasible range to the aggregator (operation 604 of FIG. 6).

Operations 404, 406 and 408 of FIG. 4 represent collecting the initial range information from each of the controllers. When the range information is received at the aggregator from the controllers, $P_{min} = \Sigma_i p_{min}^i$ and $P_{max} = \Sigma_i p_{max}^i$ are calculated; (note that it is feasible to begin summing before each of the controllers has responded). Further note that if the desired values of some elements of $P_d$ do not belong to $[P_{min}, P_{max}]$ then the constraint (eq. 5c) is not feasible. Otherwise, assuming $p_d^j$ being the j-th element of $P_d$, the ratio vector r is calculated as $$r_j := \frac{p_d^j - P_{min}}{P_{max} - P_{min}}$$

where $r_j$ is the j-th element of r. The value of r is then sent to the controllers, which may differ per controller. Note that the value of r corresponds to the target power obtained from the independent service operator, (operation 410), which may be obtained independently at any suitable time before the ratios are computed and sent (operations 412 and 414).

When the ratio vector is received by a controller (operation 606 of FIG. 6), at each load $L_i$, the power vector $P_i$ is initialized by setting the j-th element of it as $P_i^j = P_{min}^i + r_j (p_{max}^i - p_{min}^i)$ (operation 608 of FIG. 6). The controlling of the load based upon this initial power vector (which is the current power vector at this time) is represented by operation 610 of FIG. 6.

It can be easily shown that the sequence $\{P_i\}$ provides feasible power vectors for the loads $L_i \in \mathcal{L}$ and it satisfies the constraint 5c.

Figure 5:
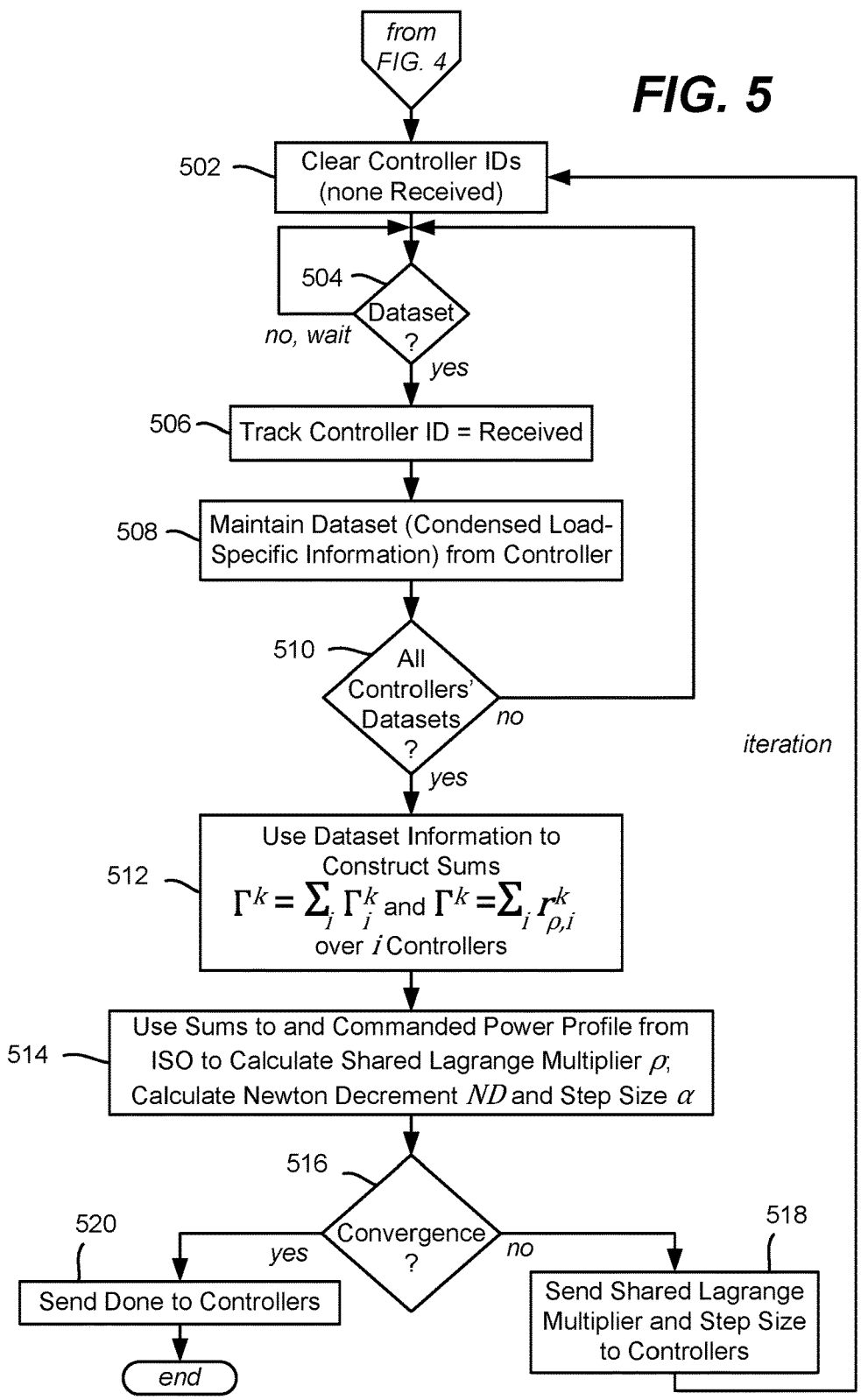
Figure 7:
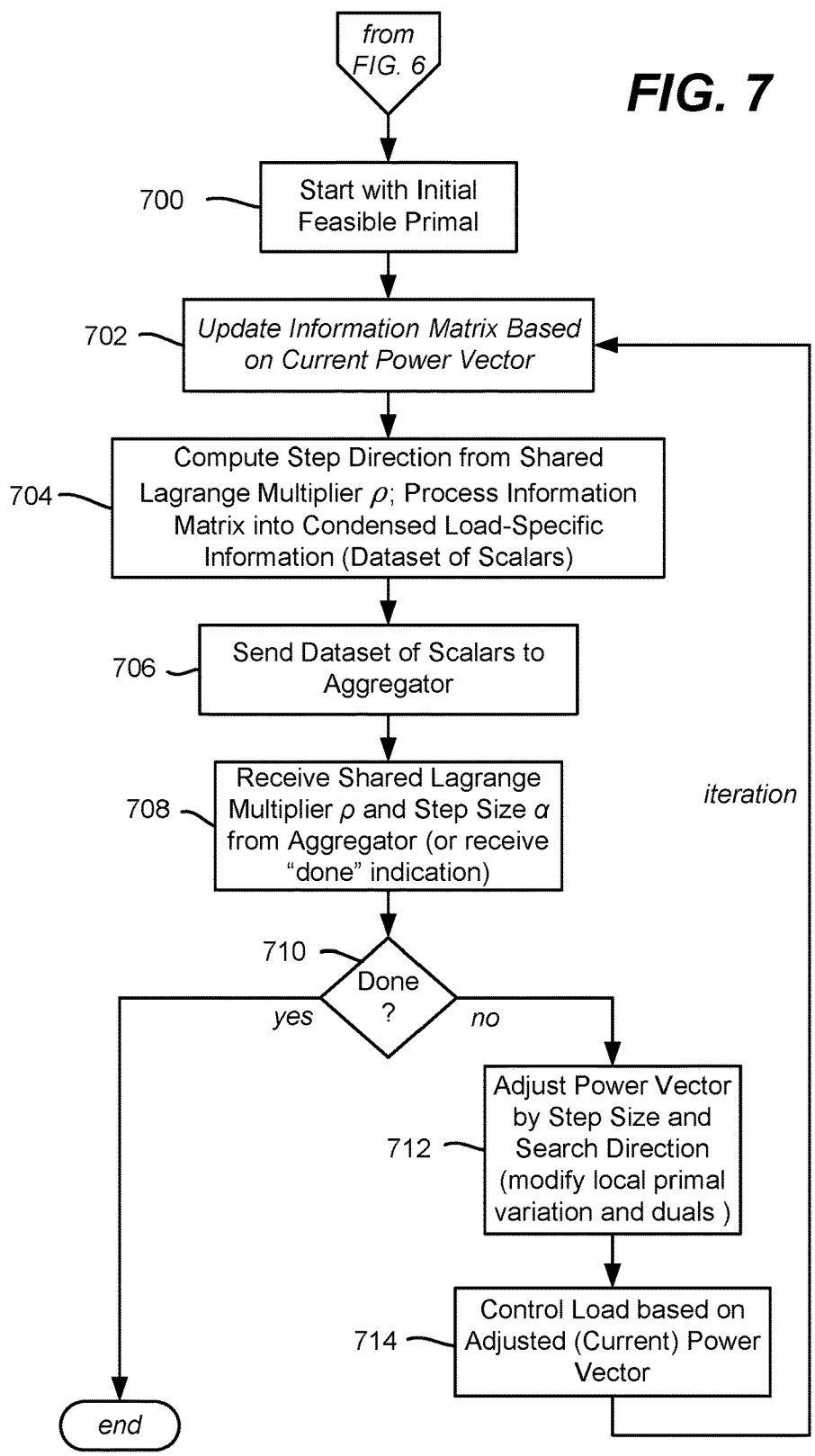

The optimization phase is described herein with reference to the optimization flow diagrams of FIG. 5 (the aggregator optimization-related operations) and FIG. 7 (the controller optimization-related operations). For example, the aggregator clears its tracking information (that assures each controller reports its data) and waits for the controllers to begin sending their datasets until each is received, as represented by operations 502, 504, 506 and 508 of FIG. 5.

Each controller starts with its own initial feasible primal $Y^0$ (e.g., operation 700 of FIG. 7, not part of the iterations). Note that operation 702 represents updating the information matrix for that node, which may occur independent of any controller operations, e.g., as the power vector changes.

At each load $L_i$, operation 704 is performed, which calculates the step direction and also generates the scalars that represent the information matrix in condensed for, e.g., $\Gamma_i^k$, $r_{\rho,i}^k$, $a_i^k = \Delta Y_{i,\rho}^{k^T} H_i^k \Delta Y_{i,\rho}^k$, $b_i^k := \Delta Y_{i,\rho}^{k^T} H_i^k \Delta Y_{i,0}^k$ and $c_i^k := \Delta Y_{i,0}^{k^T} H_i^k \Delta Y_{i,0}^k$ where $$\Gamma_i^k := [C_i \ 0](K_i^k)^{-1} \begin{bmatrix} C_i^T \\ 0 \end{bmatrix} \quad (16)$$

(a surrogate for sensitivity of power with respect to in Lagrange multiplier $\rho$);

$$r_{\rho,i}^k := [C_i \ 0](K_i^k)^{-1} \begin{bmatrix} \nabla_{Y_i} F_i(Y_i) \\ 0 \end{bmatrix}$$

(representing the optimal change of power once $\rho = 0$);

$$\Delta Y_{i,0}^k := [I \ 0](K_i^k)^{-1} \begin{bmatrix} C_i^T \\ 0 \end{bmatrix};$$

(representing the sensitivity of the local search direction with respect to $\rho$);

$$\Delta Y_{i,\rho}^k := [I \ 0](K_i^k)^{-1} \begin{bmatrix} \nabla_{Y_i} F_i(Y_i) \\ 0 \end{bmatrix}$$

(representing the local search direction once $\rho = 0$.

These per-node dependent values are sent to the aggregator by each controller at operation 706 of FIG. 7.

The aggregator, as represented by operation 512 of FIG. 5, constructs $\Gamma^k = \Sigma_i \Gamma_i^k$ and $r_\rho^k = \Sigma_i r_{\rho,i}^k$, note that the summations may begin before each controller has reported its dataset. The aggregator, as represented by operation 514 of FIG. 5, calculates $\rho^k$ using (eq. 8), calculates the Newton decrement, $ND(Y^k) = \sqrt{\Sigma_i(a_i^k \rho^{k^2} + 2b_i^k \rho^k + c_i^k)}$, and calculates $\alpha_k$ according to (15). If the value of $ND(Y^k)$ is sufficiently small, as based upon a predefined convergence level, operation 516 terminates the iterations. Otherwise, operation 518 sends $\rho^k$ and $\alpha_k$ to the controllers.

At each controller, if $\rho^k$ and $\alpha_k$ are received (operations 708 and 710 of FIG. 7), $\rho^k$ and $\alpha_k$ are used to calculate the local primal variation and duals according to (eq. 11) and update the primal according to (eq. 6); (operation 712 of FIG. 7. This changes the power control of the load (step 714). Note that operation 710 represents receiving a "done" indication from the aggregator, which is not strictly necessary if operation 708 does not receive anything further, until operation 602 restarts the next controller initialization.

Turning to another aspect, some loads have discrete power consumption, that is, are either on or off (in contrast to loads that accept continuous values for power control). Described herein is an algorithm that can handle loads that only accept boundary values of the power feasible interval (assuming the interval is the range from minimum to maximum). Thus, the power only accepts discrete values, e.g., $p_i \in \{p_{min}^i, p_{max}^i\}$ for the loads $L_i \in \mathcal{L}_d \subset \mathcal{L}$. A general goal here is to avoid mixed-integer programming, which is often not suitable for real time optimization, especially for large scale problems.

To this end, the optimization problem is first solved according to the algorithm assuming all the loads accept continuous values for power within the feasible interval. Let $\{\overline{P}_i\}$ be the sequence of optimal power vectors and $P_{dsc} := \Sigma_{L_i \in \mathcal{L}_d} \overline{P}_i$ be the power consumed by loads with discrete power consumption. Further, let $N_{dsc} = |\mathcal{L}_d|$ be number of the loads with discrete power input. The following algorithm turns the value of elements of $\overline{P}_i$ to $p_{min}^i$ of $p_{min}^i$ so that the desired power $P_d$ is tracked as close as possible while the power values closer to maximum have higher priority to be switched to $p_{max}^i$.

Via operations 802, 806 and 808, for each element j, which represents the j-th step in the prediction horizon, operation 804 sorts the sequence $$\left\{ \frac{p_{max}^j - \overline{P}_i^j}{p_{max}^j - p_{min}^j} \right\}$$

and denotes it by $\{\hat{P}_i^j\}$. Also, operation 804 denotes the corresponding sequence of the load numbers by I.

Operation 810 finds the maximum value of $n_j$ such that $\Sigma_{i=1}^{n_j} P_{max}^{I_i} \leq P_d^j$. Operation 812 sets $P_{I_k}^j = p_{max}^{I_k}$, for $k=1, \ldots, n_j$ and sets the rest to $p_{max}^{j_k}$.

Combining the continuous load optimization with the above-described discrete load post-processing allows the technology to handle any mixture of continuous and discrete loads. The effectiveness of the proposed distributed optimal control scheme may be shown via a numerical simulation, e.g., considering 100 buildings as the distributed loads. Each building is individually controlled by its own HAVC control system. Each building may have single or multiple Roof Top Units (RTUs) managed by a single controller, or multiple controllers through a Building Management System (BMS). Each building communicates with the aggregator, e.g., via a controller as described herein. As described herein, a main job of the distributed optimal controller is to compute power set points to each building such that the sum of powers consumed by the buildings track the power set point commanded by the grid independent service operator (ISO), while keeping each building temperature within the defined comfort zone to the extent possible. The thermal dynamics of the i-th building may be modeled using an equivalent RC circuit, as:

$$C_i \frac{d\tau_i}{dt} = -\frac{\tau_i - \tau_i^0}{R_i} - P_i, \qquad (17)$$

where $P_i$ is the input power, $\tau_i^0$ is the ambient temperature [80° F.], $R_i$ is the thermal resistance [2.5° C./kW ], $C_i$ is the thermal capacitance [1.5 kW h/° C.] and $P_{max_i}$ is the maximum power consumption [7.2 kW ].

The above parameters represent a nominal load model. The load parameters may be stochastically perturbed to account for model uncertainties in different buildings. At the abstraction level from the aggregator's perspective, this RC model captures the building dynamics well, while keeping the computations tractable for a larger number of loads. It can be reasonably assumed that the dynamics of the heating, ventilation and air conditioning (HVAC) controller is much faster than the thermal dynamics of the building, and can be neglected in this context. Further, assume the loads are of the same dynamic time scale and that the communication delays between loads and the aggregator are negligible. While older buildings have ON-OFF HVAC controllers, thus making them a discrete load, most newer buildings are equipped with either variable air volume (VAV) handling, or electronic expansion valves in the HVAC refrigeration cycle, making them a continuously controllable load. For continuous loads, the power set point at each instant can be any number between 0 and $P_{max}$. For discrete loads, the power at each instant is either 0 (OFF mode) or $P_{max}$ (ON mode), and there is also a hysteresis mechanism, such as with the minimum on and off times as follows:

MIN-OFF-TIME=4 mins
MIN-ON-TIME=6 mins, which means that once the HVAC is OFF is remains OFF for at least 4 minutes, and once it is turned ON, it remains ON for at least 6 minutes. In order to accommodate both newer and older buildings, in these example simulations, fifty loads are randomly selected as continuous and the remaining fifty loads as discrete. The loads are simulated with random and different initial temperatures. The thermal comfort zone is defined to be between 75° F. and 79° F. and is penalized using a log barrier in the optimization overall cost function. A load is referred to as "active" if the load is available for control. Continuous loads are virtually always available, while discrete loads are only available if their status is changeable, i.e. they are not within their time hysteresis region.

At each time step, an interior point optimization problem is solved in a distributed fashion as described herein. In each iteration of the optimization, the aggregator waits until it receives information from all loads, computes p and broadcasts back to all loads. The potential time differences between each load to complete one iteration of the optimization is negligible compared to the time scale of the load dynamics. Thus, during the potential wait time of the aggregator, the load temperatures remain almost constant. To put this into context, one iteration of the optimization problem may take a fraction of a second, while the thermal time constant of a building is typically several minutes up to a few hours.

Figure 9:
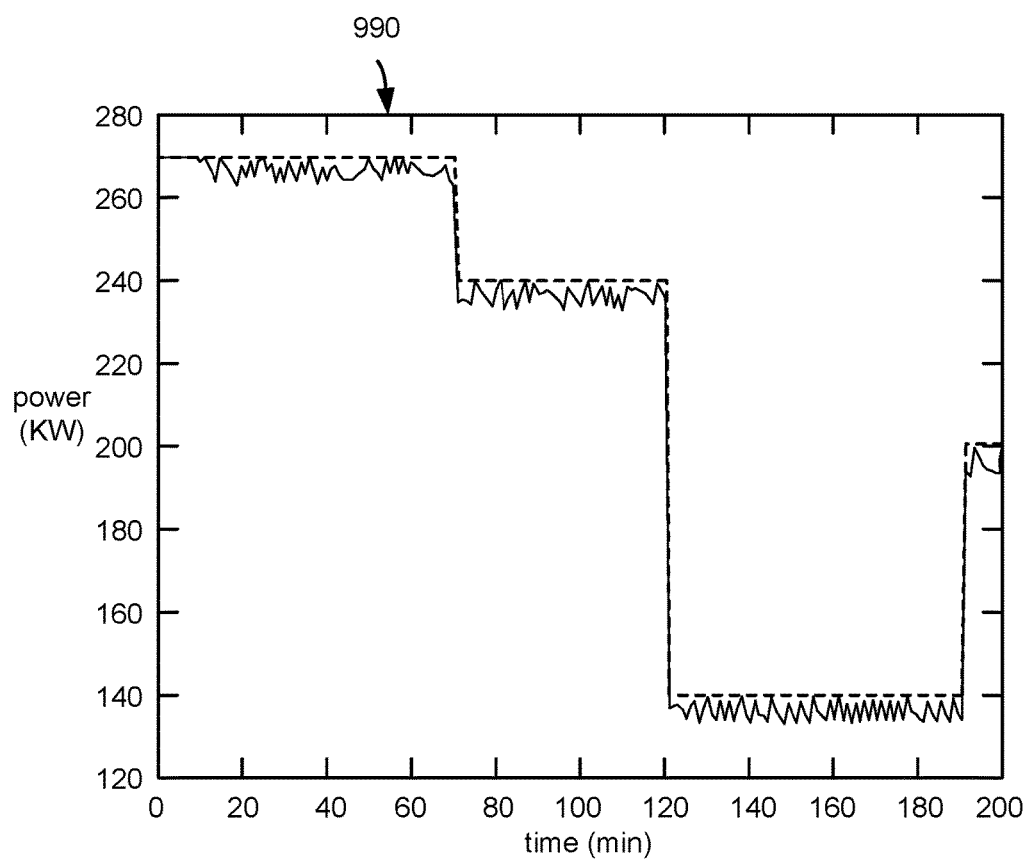
FIG. 9 is an example graph representation of a simulation demonstrating achieved power versus commanded power over time, according to one or more example implementations.

FIG. 9 shows a graph of the total sum of achieved power the (solid line) versus the commanded power (the dashed line) over time. If all active loads (loads available for control) are continuously controllable, the power command will be tracked virtually exactly, materializing the equality constraint (eq. 2). However, in the presence of discrete loads, exact tracking of the power commands may not be possible. Thus, the tracking depends on the number of loads of each type, the parameters of each load and the commanded power value.

The power tracking requirement in this case is that the total sum of building powers tracks the power command as closely as possible without exceeding the power command. In this example, at each sampling time, first assign the power of discrete loads that are not active, and subtract the sum of power of such subset of loads from the overall power command to get the sum of powers that need to be matched by the active loads (which itself is a mixture of continuous and discrete loads).

Figure 8:
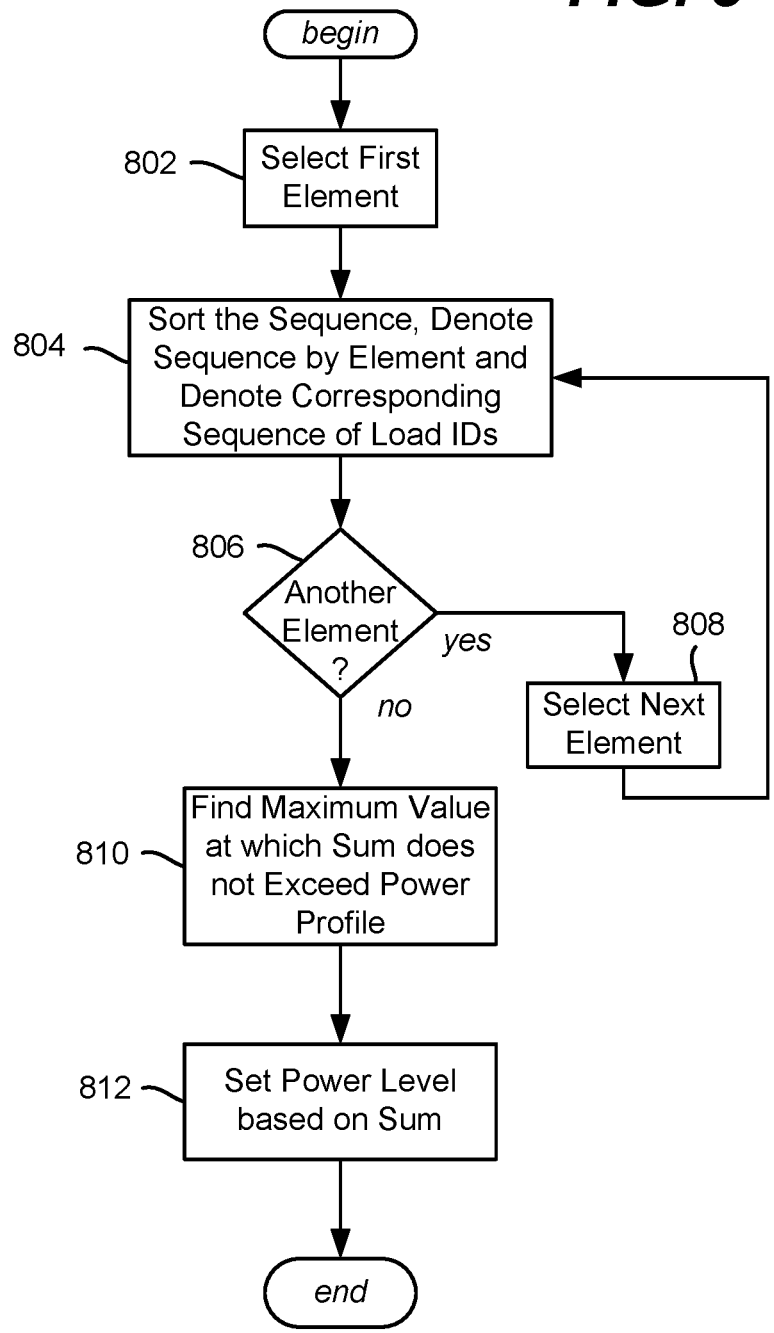
FIG. 8 is a flow diagram showing example operations for controlling a discrete load, according to one or more example implementations.

After solving the optimization problem, the discrete active loads are post-processed using the algorithm described in with reference to FIG. 8. As shown in FIG. 9, the sum of load powers never exceeds the command, which is expected. The RMS value of the relative power tracking error for this simulation is 2.32%. The number of active loads and their individual power set points are automatically computed by the optimization algorithm at each sampling time. Note that at the beginning, the discrete loads are OFF, and because they have to remain OFF to fulfill the hysteresis requirement, at the first four sampling times, only the fifty continuous loads are active.

Figure 10:
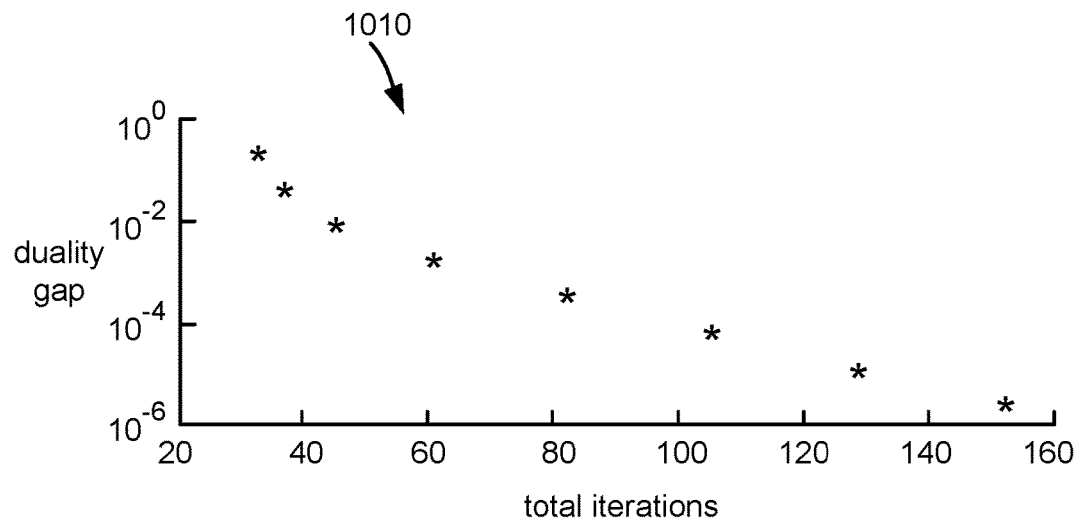
FIG. 10 is an example graph representation of optimizations' duality gap changes over a number of iterations, which may be used to determine sufficient convergence, according to one or more example implementations.
Figure 11:
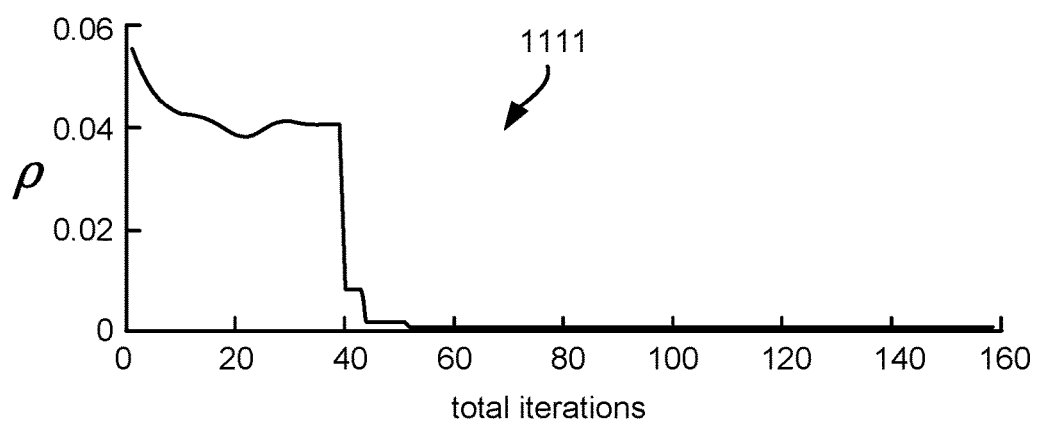
FIG. 11 is an example graph representation of optimizations' Lagrange multiplier value changes over a number of iterations, which may be used to determine sufficient convergence, according to one or more example implementations.

In terms of convergence performance, in graph 1010 of FIG. 10 convergence via the duality gap (the difference between the primal and dual solutions) is shown. In graph 1111 of FIG. 11, the values of $\rho$ (the Lagrange multiplier associated with power balance) versus the total number of iterations in an optimization problem is shown as solved within one sampling time. The convergence criterion can be established based on either the duality gap or rate of change of $\rho$, for example.

As can be seen, the technology provides an optimization algorithm for cooperation of distributed flexible power resources to provide regulation and ramping reserve as an ancillary service. This may facilitate the penetration of renewable energies. The distributed iterative operations make real-time distributed optimization feasible, with the target aggregated power being achieved while not significantly impacting the local operation of the distributed flexible power resources. The scalable optimal flexibility control distributes the computational burden of large scale optimization among loads/nodes while they communicate with the aggregator. The technology is highly efficient and can be implemented at the commercial aggregator level with a very large number of loads.

One or more aspects are directed towards a load controller of distributed load controllers, the load controller coupled to manage a power-consuming load that consumes power supplied via a consumer supply device of a power grid, wherein the load controller manages the load to satisfy the load's quality of service constraint or constraints, and wherein the load controller is communicatively coupled to an aggregator that aggregates data sent by the load controller and received from one or more other distributed load controllers of the distributed load controllers, the data comprising initial data that comprises a power range. In one or more aspects, the load controller is configured to receive an initial ratio value from the aggregator, wherein the initial ratio value is based on the power range and other power range data from the one or more other distributed load controllers of the distributed load controllers, and wherein the load controller is further configured to use the initial ratio value to set a local power level to an initial level, and use load-specific information of the power-consuming load to determine condensed information comprising one or more scalar values that represent the load-specific information in a more compact form than the load-specific information, and to communicate the condensed information to the aggregator, wherein the local power level is local to the load controller. In one or more aspects, the load controller is further configured to perform iterations based on communication with the aggregator to modify the local power level to approach a specified aggregated load power consumption level until the aggregator determines that the iterations have satisfied a defined condition, and wherein the iterations are performed to receive a step size value and a global value from the aggregator, wherein the step size value and the global value are based on the condensed information and other condensed information from the one or more other distributed load controllers of the distributed load controllers, determine a step direction, control the power-consuming load with an adjustment based on the step size value and the step direction to approach the specified aggregated load power consumption level, re-determine updated condensed information that updates the condensed information and comprises one or more updated scalar values that represent the load-specific information after the adjustment, and communicate the updated condensed information to the aggregator.

One or more aspects are directed towards receiving, by a system comprising a processor, respective condensed datasets representative of respective load-specific information received from respective load controllers, wherein the respective load controllers are coupled to control a power-consuming load that obtains power from a power grid, and wherein the respective condensed datasets are smaller in size than respective full datasets associated with the respective load controllers, and determining a global value and a step size based on the respective condensed datasets and a specified aggregated power level. Aspects comprise sending the global value and the step size to the respective load controllers for use in adjusting respective local power consumptions of the respective load controllers to satisfy the specified aggregated power level, receiving respective updated condensed datasets from the respective load controllers that update the respective condensed datasets, wherein the respective updated condensed datasets are based on the respective load-specific information associated with the power-consuming load of the respective load controllers after the adjusting of the respective local power consumptions in respective step directions determined by the respective load controllers, and determining, from the respective updated condensed datasets, whether the respective load controllers have satisfied the specified aggregated power level to a defined extent, and in response to determining that the specified aggregated power level has not been satisfied to the defined extent. Other aspects comprise determining an updated global value and an updated step size based on the respective updated condensed datasets and the specified aggregated power level, and sending the updated global value and the updated step size to the respective load controllers for use in further adjusting the respective local power consumptions to satisfy the specified aggregated power level.

One or more aspects are directed towards communicating load-related power range data to an aggregator, wherein the load-related power range data from the load controller and other load-related power range data from one or more other load controllers of the group of distributed load controllers are usable by the aggregator to determine initialization data that is to be received by the load controller in response to the communicating of the load-related power range data, and is to be sent to the one or more other load controllers. Further described herein is receiving the initialization data from the aggregator, determining condensed load-specific information of a power-consuming load managed by the load controller based at least in part on the initialization data and communicating the condensed load-specific information to the aggregator, wherein the condensed load-specific information from the load controller and other condensed load-specific information from the one or more other load controllers are usable by the aggregator to determine a step size and a global multiplier value that are to be received by the load controller in response to the communicating of the condensed load-specific information and are to be sent to the one or more other load controllers. One or more aspects comprise receiving the step size and the global multiplier value from the aggregator; based on the step size and the global multiplier value from the aggregator, determining a step direction, adjusting the load power consumption in the step direction, determining current condensed load-specific information after the adjusting of the load power consumption, and communicating the current condensed load-specific information to the aggregator, wherein the current condensed load-specific information from the load controller and other current condensed load-specific information from the one or more other load controllers are usable by the aggregator to evaluate whether aggregated power levels of the group of distributed load controllers have converged to a defined convergence level, and in response to the aggregated power levels being determined not to have converged to the defined convergence level, determining a new step size that replaces the step size and a new global multiplier value that replaces the global multiplier value based on the current condensed load-specific information and the other current load-specific information, and wherein the new step size and the new global multiplier value are to be received by the load controller and sent to the other load controllers. One or more other aspects may comprise receiving the new step size and the new global multiplier value, and in response to the aggregated power levels being determined to have converged to the defined convergence level, ending the operations until a later time.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Accordingly, the invention is not to be limited to any single implementation, but rather is to be construed in breadth, spirit and scope in accordance with the appended claims.

What is claimed is:

1. A system, comprising:
a load controller of distributed load controllers, the load controller coupled to manage a power-consuming load that consumes power supplied via a consumer supply device of a power grid, wherein the load controller manages the load to satisfy the load's quality of service constraint or constraints,
wherein the load controller is communicatively coupled to an aggregator that aggregates data sent by the load controller and received from one or more other distributed load controllers of the distributed load controllers, the data comprising initial data that comprises a power range,
wherein the load controller is configured to receive an initial ratio value from the aggregator,
wherein the initial ratio value is based on the power range and other power range data from the one or more other distributed load controllers of the distributed load controllers,
wherein the load controller is further configured to use the initial ratio value to set a local power level to an initial level, and use load-specific information of the power-consuming load to determine condensed information comprising one or more scalar values that represent the load-specific information in a more compact form than the load-specific information, and to communicate the condensed information to the aggregator, wherein the local power level is local to the load controller,
wherein the load controller is further configured to perform iterations based on communication with the aggregator to modify the local power level to approach a specified aggregated load power consumption level until the aggregator determines that the iterations have satisfied a defined condition, and
wherein the iterations are performed to:
receive a step size value and a global value from the aggregator, wherein the step size value and the global value are based on the condensed information and other condensed information from the one or more other distributed load controllers of the distributed load controllers,
determine a step direction,
control the power-consuming load with an adjustment based on the step size value and the step direction to approach the specified aggregated load power consumption level,
re-determine updated condensed information that updates the condensed information and comprises one or more updated scalar values that represent the load-specific information after the adjustment, and
communicate the updated condensed information to the aggregator.

2. The system of claim 1, wherein each iteration to control the power-consuming load attempts to satisfy one or more quality of service constraints of the power-consuming load.

3. The system of claim 1, wherein the power range comprises a minimum feasible value for power consumption by the power-consuming load and a maximum feasible value for power consumption by the power-consuming load.

4. The system of claim 1, wherein the global value comprises a Lagrange multiplier, wherein the iterations comprise Newton iterations, wherein the step size value is determined as a Newton step, and wherein the step direction is determined as a Newton search direction.

5. The system of claim 1, wherein the step size value being iteratively determined and received from the aggregator enables a quadratic convergence to the specified aggregated load power consumption level.

6. The system of claim 1, wherein the load controller comprises a heating, ventilation and air conditioning control system of: a single zone, a multiple zone building with a building managements system or a multiple zone building without a building managements system.

7. The system of claim 1, wherein the load controller manages a continuously controllable load, or wherein the load controller manages a discrete load and wherein the load controller is configured to perform discrete load post-processing on the power consumption level to manage the discrete load.

8. The system of claim 1, wherein the condensed load-specific information comprises a scalar value representative of a sensitivity of power with respect to the global value.

9. The system of claim 1, wherein the condensed load-specific information comprises a scalar value representative of an optimal or a more optimal change of power once the global value is zero.

10. The system of claim 1, wherein the condensed load-specific information comprises a scalar value representative of a sensitivity of a local search direction with respect to the global value.

11. The system of claim 1, wherein the condensed load-specific information comprises a scalar value representative of a local search direction once the global value is zero.

12. A method, comprising:
receiving, by a system comprising a processor, respective condensed datasets representative of respective load-specific information received from respective load controllers, wherein the respective load controllers are coupled to control a power-consuming load that obtains power from a power grid, and wherein the respective condensed datasets are smaller in size than respective full datasets associated with the respective load controllers;
determining a global value and a step size based on the respective condensed datasets and a specified aggregated power level;
sending the global value and the step size to the respective load controllers for use in adjusting respective local power consumptions of the respective load controllers to satisfy the specified aggregated power level;
receiving respective updated condensed datasets from the respective load controllers that update the respective condensed datasets, wherein the respective updated condensed datasets are based on the respective load-specific information associated with the power-consuming load of the respective load controllers after the adjusting of the respective local power consumptions in respective step directions determined by the respective load controllers; and
determining, from the respective updated condensed datasets, whether the respective load controllers have satisfied the specified aggregated power level to a defined extent, and in response to determining that the specified aggregated power level has not been satisfied to the defined extent,
determining an updated global value and an updated step size based on the respective updated condensed datasets and the specified aggregated power level, and
sending the updated global value and the updated step size to the respective load controllers for use in further adjusting the respective local power consumptions to satisfy the specified aggregated power level.

13. The method of claim 12, further comprising, initializing the respective load controllers, including receiving power ranges from the respective load controllers, determining respective initial ratio values from the power ranges, and sending the respective initial ratio values to the respective load controllers.

14. The method of claim 12, wherein the determining the step size based on the respective condensed datasets comprises determining a Newton step, wherein the method further comprises determining a Newton decrement value, and wherein the determining whether the respective load controllers have satisfied the specified aggregated power level to the defined extent comprises comparing the Newton decrement value to a defined convergence level.

15. The method of claim 14, further comprising selecting the defined convergence level based on an analysis of a specified optimization time and a specified level of optimization.

16. The method of claim 12, further comprising, repeating the receiving the respective updated condensed datasets, the determining and the sending of the updated global value and the updated step size, and the determining whether the respective load controllers have satisfied the specified aggregated power level to the defined extent periodically according to a defined periodicity.

17. The method of claim 12, wherein the receiving the respective updated condensed datasets from the respective load controllers comprises receiving at least one of: a value representative of a sensitivity of power with respect to the global value, a value representative of an optimal or a more optimal change of power once the global value is zero, a value representative of a sensitivity of a local search direction with respect to the global value, or a value representative of a local search direction once the global value is zero.

18. A non-transitory machine-readable medium, comprising executable instructions that, when executed by a load controller of a group of distributed load controllers, facilitate performance of operations, comprising:
communicating load-related power range data to an aggregator, wherein the load-related power range data from the load controller and other load-related power range data from one or more other load controllers of the group of distributed load controllers are usable by the aggregator to determine initialization data that is to be received by the load controller in response to the communicating of the load-related power range data, and is to be sent to the one or more other load controllers;
receiving the initialization data from the aggregator;
determining condensed load-specific information of a power-consuming load managed by the load controller based at least in part on the initialization data;
communicating the condensed load-specific information to the aggregator, wherein the condensed load-specific information from the load controller and other condensed load-specific information from the one or more other load controllers are usable by the aggregator to determine a step size and a global multiplier value that are to be received by the load controller in response to the communicating of the condensed load-specific information and are to be sent to the one or more other load controllers;
receiving the step size and the global multiplier value from the aggregator;
based on the step size and the global multiplier value from the aggregator, determining a step direction, adjusting the load power consumption in the step direction, determining current condensed load-specific information after the adjusting of the load power consumption, and communicating the current condensed load-specific information to the aggregator, wherein the current condensed load-specific information from the load controller and other current condensed load-specific information from the one or more other load controllers are usable by the aggregator to evaluate whether aggregated power levels of the group of distributed load controllers have converged to a defined convergence level, and in response to the aggregated power levels being determined not to have converged to the defined convergence level, determining a new step size that replaces the step size and a new global multiplier value that replaces the global multiplier value based on the current condensed load-specific information and the other current load-specific information, and wherein the new step size and the new global multiplier value are to be received by the load controller and sent to the other load controllers;

receiving the new step size and the new global multiplier value; and in response to the aggregated power levels being determined to have converged to the defined convergence level, ending the operations until a later time.

19. A non-transitory machine-readable medium of claim 18, wherein the determining the current condensed load-specific information from the load controller at the aggregator comprises determining at least one of: a value representative of a sensitivity of power with respect to the global value, a value representative of an optimal or a more optimal change of power once the global value is zero, a value representative of a sensitivity of a local search direction with respect to the global value, or a value representative of a local search direction once the global value is zero.

20. A non-transitory machine-readable medium of claim 18, wherein the receiving the initialization data by the load controller comprises receiving a power ratio vector by the load controller, and wherein the load controller initializes a power vector based at least in part on the power ratio vector and the load-related power range data.

\* \* \* \* \*